US011570187B1

(12) United States Patent
Levin et al.

(10) Patent No.: US 11,570,187 B1
(45) Date of Patent: *Jan. 31, 2023

(54) DETECTION OF CYBERATTACKS AND OPERATIONAL ISSUES OF INTERNET OF THINGS DEVICES

(71) Applicant: ShieldIOT Ltd., Herzliya (IL)

(72) Inventors: Ohad Levin, Haifa (IL); Dan Feldman, Haifa (IL)

(73) Assignee: SHIELDIOT LTD., Herzliya (IL)

( * ) Notice: Subject to any disclaimer, the term of this patent is extended or adjusted under 35 U.S.C. 154(b) by 339 days.

This patent is subject to a terminal disclaimer.

(21) Appl. No.: 16/923,065

(22) Filed: Jul. 7, 2020

Related U.S. Application Data

(63) Continuation of application No. 16/586,985, filed on Sep. 29, 2019.

(60) Provisional application No. 62/748,462, filed on Oct. 21, 2018.

(51) Int. Cl.
*H04L 9/40* (2022.01)
*G06F 16/35* (2019.01)
*G06F 16/904* (2019.01)

(52) U.S. Cl.
CPC .......... *H04L 63/1416* (2013.01); *G06F 16/35* (2019.01); *G06F 16/904* (2019.01); *H04L 63/0884* (2013.01); *H04L 63/1425* (2013.01)

(58) Field of Classification Search
CPC ............. H04L 63/1416; H04L 63/0884; H04L 63/1425; G06F 16/904; G06F 16/35
See application file for complete search history.

(56) References Cited

U.S. PATENT DOCUMENTS

| | | | |
|---|---|---|---|
| 9,843,596 B1* | 12/2017 | Averbuch | G06F 21/554 |
| 10,326,787 B2* | 6/2019 | Wolkov | G06F 30/20 |
| 2014/0165198 A1* | 6/2014 | Altman | G06F 21/561 |
| | | | 726/23 |
| 2016/0028750 A1* | 1/2016 | Di Pietro | H04W 12/125 |
| | | | 726/23 |
| 2018/0159894 A1* | 6/2018 | Reddy | H04L 63/1458 |
| 2018/0173894 A1* | 6/2018 | Boehler | G06F 21/6254 |
| 2020/0112571 A1* | 4/2020 | Koral | G06N 3/08 |

OTHER PUBLICATIONS

Machine translation of Chinese patent application CN 107249000 A, Jun-long Zhu et al. (Year: 2017).*
Andeas Kind et al, Histogram Traffic Anomaly Detection, IEEE (Year: 2009).*

* cited by examiner

*Primary Examiner* — Shanto Abedin
(74) *Attorney, Agent, or Firm* — William H. Dippert; Laurence A. Greenberg; Werner H. Sterner

(57) ABSTRACT

There may be provided a method for detecting a cyberattack or an operational issue, the method may include generating, by an IOT device or by an intermediate device located upstream to the IOT device and downstream to a computerized system, a first core-set, wherein the core-set comprises weighted records that are an approximation of a first data set related to a behavior of the IOT device; sending to the computerized system the first core-set; and finding, by the computerized system, outliers in the first core-set, and labeling the outliers as cyber attacks or operational events by the relations between the outliers and a second dataset of cluster centroid indicative of cyber attacks or operational events.

12 Claims, 8 Drawing Sheets

DETECTION OF CYBERATTACKS AND OPERATIONAL ISSUES OF INTERNET OF THINGS DEVICES

CROSS REFERENCE

This application is a continuation in part (CIP) of U.S. patent Ser. No. 16/586,985 filing date Oct. 21, 2019 which claims priority from U.S. provisional patent Ser. No. 62/748,462 filing date Oct. 21, 2018—both are incorporated herein by reference.

FIELD OF THE INVENTION

The present invention generally relates to detecting cyberattacks and operational issues in high scale IoT networks and more specifically, relates to utilizing anomaly detection to identify cyberattacks carried out in computerized devices communicating over high scale Internet of Things (IoT) networks.

BACKGROUND OF THE INVENTION

With the growth of networked computer systems, multiple devices have been coupled over a network to control, manage and operate computerized tasks. In multiple cases, holding one system which controls and manages the security in an inspected network with multiple inspected computers seemed to be a good approach. The approach of employing one dedicated system for large network of critical machines for offloading the security operational tasks to this system has multiple benefits. Yet, in some cases, the security operational tasks conducted by a dedicated system required involvement of the inspected computerized devices communicating over the network. One of the challenges manifested by this approach is with the number of devices a single and central system manages. In some cases, with such an approach, the detection of a security issue may take a long time which can jeopardize the health of the network and the devices communicating over this network.

The use case of IoT devices, wherein a single and light device provided in a small form factor can be dedicated to a relatively narrow set of tasks, led to a requirement of multiple devices controlling a large set of industrial devices such as sensors, cameras, recorders, and more. With IoT devices, the security central systems controlling and enforcing the security policies are required to detect security issues by managing an enormously growing number of tasks, operations, and alerts. In many cases, detecting a security issue requires receiving information, conducting probation on the data, communicating with the suspect device, and more. In some cases, a network may comprise a large number of devices communicating with each other, or with the central system. Thus, the task to complete a security detection in a reasonable time window in order to minimize the impact of the security issue, becomes challenging.

SUMMARY OF THE INVENTION

Any reference to a cyberattack may be applied mutatis mutandis to an operational issue. For example—a method for detecting a cyberattack may be applied mutatis mutandis to a method for detecting an operational issue.

There are provided systems, IOT devices, intermediate devices, methods and non-transitory computer readable medium for detecting operational issues and/or cyberattacks while reducing the traffic over a network. The reduction of traffic is obtained by performing various method steps by the IOT devices themselves. The various method steps may be performed by one or more intermediate devices located between the IOT devices and a computerized system.

The various method steps may include compression—for example by generating a coreset, performing at least a part of an anomaly detection, and the like.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the embodiments of the invention. In this regard, the description taken with the drawings makes apparent to those skilled in the art how embodiments of the invention may be practiced.

In the drawings.

DETAILED DESCRIPTION OF THE INVENTION

The present invention discloses a method operable by an IOT device and/or an intermediate device and a computerized system for identifying cyberattacks in data records captured from IoT devices by identifying outliers using machine learning anomaly detection algorithms. The data records obtained from the IoT devices and representing behavior of the IoT devices may be compressed before being sent to the computerized system. As used in the specification, the term "data records" is used to define the data values captured from the IoT devices. In some cases, the term "record" is also used to define this value. The data records can be aggregated as a group denoted as "data set".

Internet of Things (IOT) may be regarded as the extension of Internet connectivity into physical devices and everyday objects. Embedded with electronics, Internet connectivity, and other forms of hardware (such as sensors), these devices can communicate and interact with others over the Internet, and they can be remotely monitored and controlled (wikipedia.org)

The definition of the Internet of things has evolved due to convergence of multiple technologies, real-time analytics, machine learning, commodity sensors, and embedded systems. Traditional fields of embedded systems, wireless sensor networks, control systems, automation (including home and building automation), and others, all contribute to enabling the Internet of things. In the consumer market, IoT technology is most synonymous with products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers. In the industrial domain IoT changes the way business operate in Smart Cities, Manufacturing, Buildings, Meters and more.

Figure 1A:
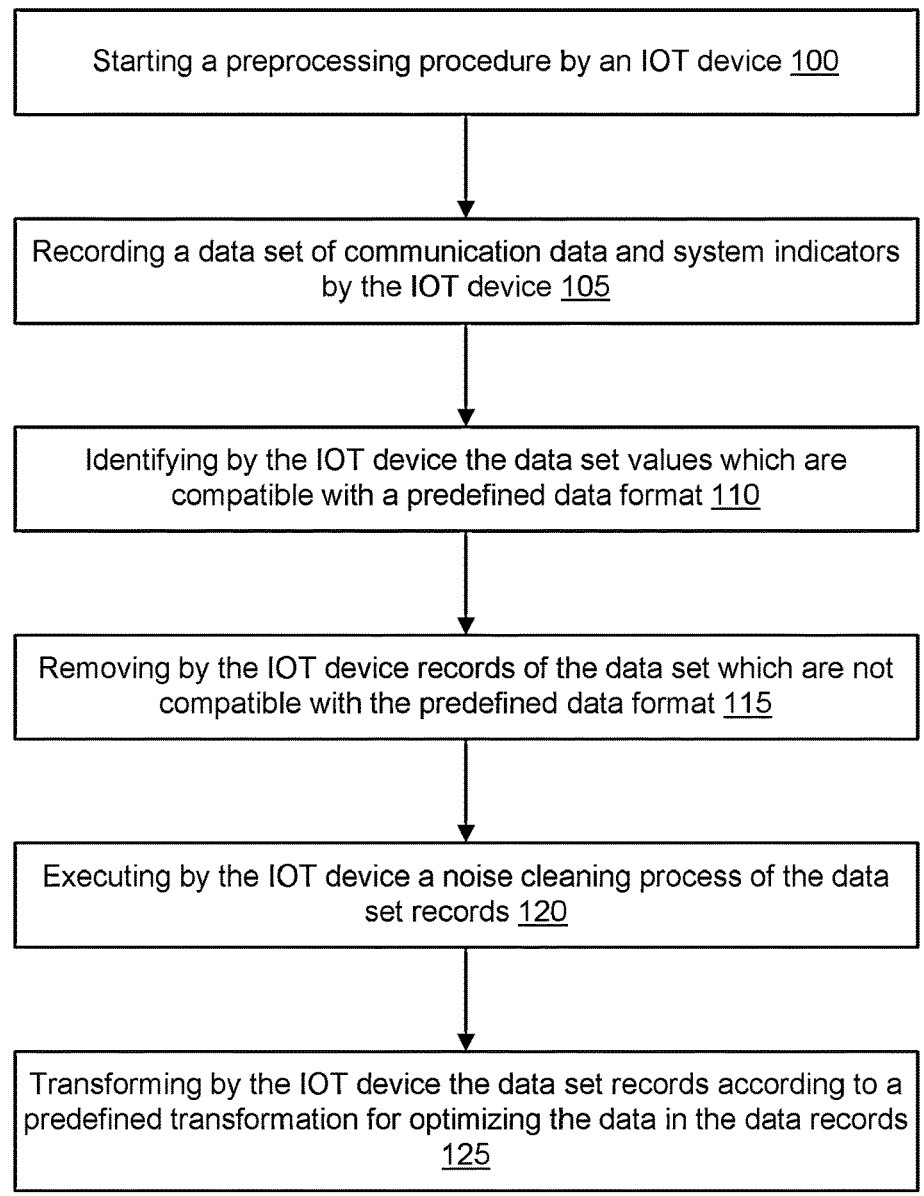
FIG. 1A discloses a computerized process.
Figure 1B:
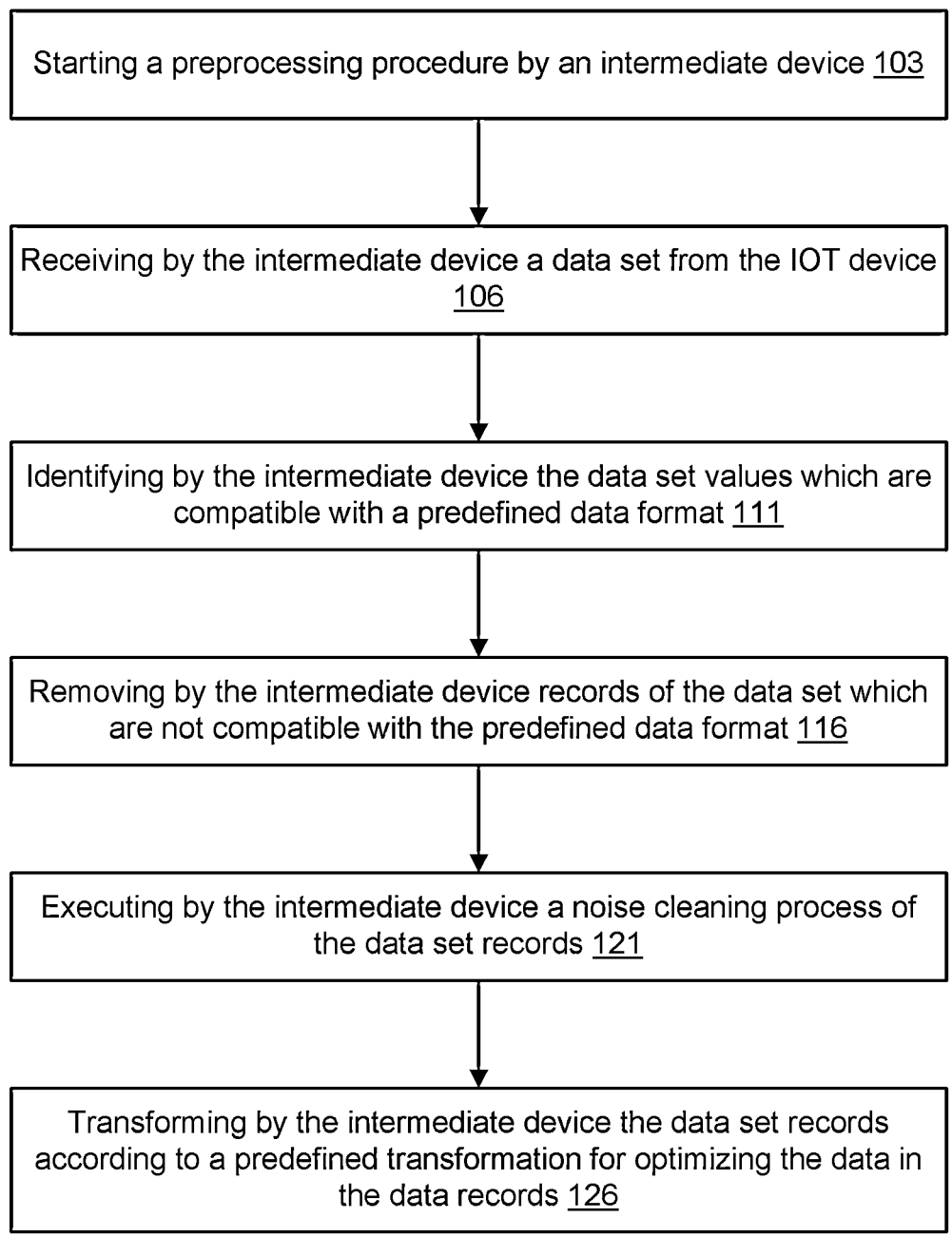
FIG. 1B discloses a computerized process.

FIGS. 1A and 1B illustrate computerized processes. The computerized process of FIG. 1A is executed by an IOT device while the computerized process of FIG. 1B is executed by an intermediate device.

The intermediate device may be functionally located between the IOT device and the computerized system.

The intermediate device may be a controller, IoT Gateway, or other computerized device.

A computerized system may be an application software operable on a computerized unit or/and a computerized device, or operable on a set of devices, comprising a memory unit coupled with a processing unit. The memory unit may be a computer-readable storage medium, configured for storing data accessible by the central application software for processing the stored data. The processing unit may comprise at least one digital processor instructed to execute methods and processes of the central application software.

FIG. 1A discloses a computerized process 101 denoted as a preprocessing-procedure designed to receive and prepare data from IoT devices for anomaly detection, according to exemplary embodiments of the present invention. At step 100 an JOT device may start the preprocessing-procedure.

At step 105 the IOT device generates a data set. The data set may represent a behavior of the IoT device communicating in a telecommunications network. The communication and operation behavior related data may be captured statistical data referring to the communication and operation behavior of the IoT device. In some cases, such data may comprise the communication-session key, Service ID, headers of the communication packets, content downloaded or uploaded by the device, number of bytes sent from a device, communication response time, the protocols utilized by the devices for communications, time stamp of initiating the communication, and the like. In some cases, the captured data may be fetched by a computerized system designed to communicate with the devices and request the data therefrom. In some other cases the devices may be configured to automatically send the communication and operation behavior related data to a computer connected to a computer-readable medium designed to capture data in a computer readable format. In some cases, such datasets may be structured from large files and tables designed to be utilized by computerized processes. At step 110 the IOT device may identify the values in the received data sets which are compatible with a predefined data format. The predefined data format may be such, textual data, time and/or date, numeric data, strings, and the like. For example, the data sets may be structured in tables preconfigured to accommodate such values of such data sets. In such an exemplary case, the predefined data format can be a table presenting numeric values with 2 decimal places only. Thus, the IOT device may identify the values in the data sets which are structured as numeric values with 2 decimal places only.

At step 115 the IOT device may remove data records comprising values which are not compatible with the predefined data format. For example, in case a data record comprising textual characters and the predefined data format is structured with numeric values only, data records comprising textual characters may be removed by the IOT device. At step 120 the IOT device may execute a noise cleaning process on the identified data records in the data sets. The noise cleaning process may comprise removing fields and values in the data set which are not compatible with the required format but represent noisy data. For example, the noise cleaning process can remove lines with mostly empty values, lines with fields values which have no numerical meaning, and the like.

At step 125 the IOT device may transform the data set records according to a predefined transformation for optimizing the data in the data sets for the calculation of the Normality Score method. In some cases, the IOT device may remove some of the columns, create new columns, transform category fields to multiple Boolean fields, enrich the data with external data feeds and the like.

FIG. 1B discloses a computerized process 102.

At step 103 an Intermediate device may start the preprocessing-procedure.

At step 106 the Intermediate device receives a data set.

At step 111 the Intermediate device may identify the values in the received data sets which are compatible with a predefined data format.

At step 116 the Intermediate device Intermediate device may remove data records comprising values which are not compatible with the predefined data format.

At step 121 the Intermediate device may execute a noise cleaning process on the identified data records in the data sets.

At step 126 the Intermediate device may transform the data set records according to a predefined transformation for optimizing the data in the data sets for the calculation of the Normality Score method.

A single intermediate device may execute said computerized process for multiple IOT devices.

Figure 2A:
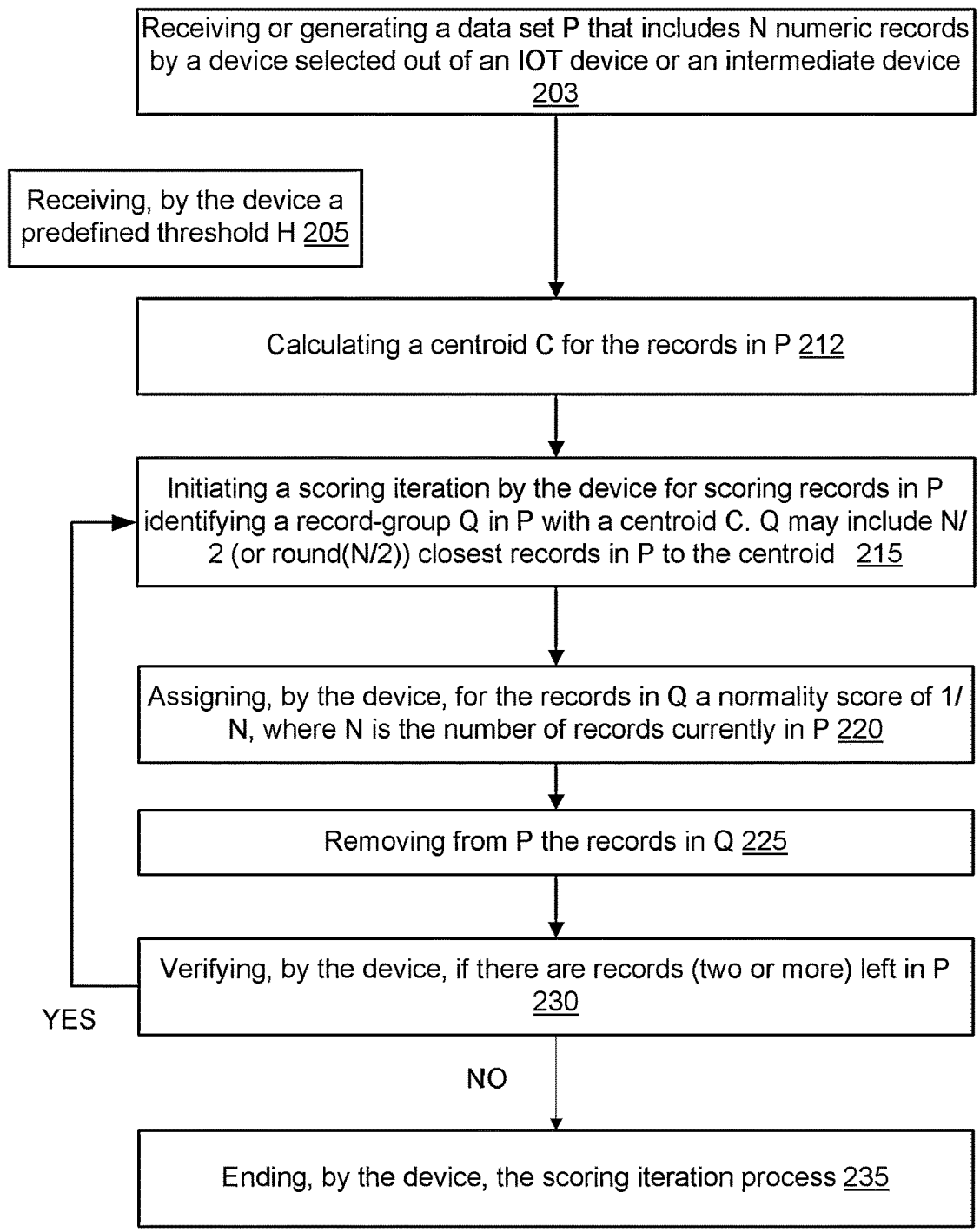
FIG. 2A discloses a method operable by a computerized system.

FIG. 2A discloses a method 201 operable by an IOT device and/or an intermediate device for calculating Normality Score on a set of data records captured from IoT devices, according to exemplary embodiments of the present invention. At step 203 an IOT device and/or an intermediate device may receive or generate a data set denoted as data set P. Such a data set P may comprise data representing statistical network activity of the IoT device (that communicates with the other devices or a centralized application over the network).

In some cases, the data set P may comprise data arranged and constructed by the preprocessing-procedure as aforementioned. The IOT device and/or an intermediate device may comprise an interface designed to receive data sets such as data set P. For example, the IOT device and/or an intermediate device may be configured to present a dedicated interface which can be utilized by a person or a computerized process, to load data sets such as data set P to the IOT device and/or the intermediate device. In some embodiments of the present invention, the IOT device and/or the intermediate device may be configured to receive the data set P, in an automatic fashion. For example, the IOT device and/or an intermediate device may access a computer-readable medium comprising the data set P and then read the data set P. In some cases, the computer-readable medium may be embedded with the computerized system. In some other cases, the computer-readable medium may be accessed via a telecommunications network. Such a telecommunications network may be the internet, local area network, wireless-based networks, and the like.

At step 205 the IOT device and/or an intermediate device may receive a numeric value H defining a threshold distance.

In some cases, the threshold distance H may be utilized to calculate the normality score of data records in P.

In some cases, H may be precalculated and configured by a user utilizing and operating the IOT device and/or an intermediate device.

At step 212 a centroid C is calculated for the records in P.

At step 215 the computerized system initiates a process, denoted as scoring iteration, for scoring the data records in P. Thus, the IOT device and/or an intermediate device may utilize the data set P to identify a group of data records in P, denoted as Q, with a centroid C.

Thus, the centroid is the data record which minimizes the square of distances from all the data records in P without the data records with distance larger than H.

The data records to be removed may be found in an iterative manner.

For example—during each iteration some of the data records in P are removed to provide a reduced set of data records. The data records to be removed may be selected as those that once removed, fulfill a certain condition. For example—the certain condition may be the N/2 points that are closest to C, where N is the number of records in P. In some cases, the centroid may be defined by a computerized process utilizing methods and processes to define the centroid C. In some embodiments of the present invention, the scoring iteration can be configured to identify more than one (K) centroid C in P. For example, the scoring iteration can be configured to identify a group of data records Q1 with centroid C1, a group of data records Q2 with centroid C2, a group of data records Q3 with centroid C3. There may be any number (K) of centroids. The number (K) of centroids may be determined in a separate calculation procedure on the edge/intermediate device.

When K exceeds one (K>1) the data records to each data record in P is associated to a certain cluster. For each such cluster a separate scoring algorithm is conducted.

For example—during each iteration some of the data records in P are removed to provide a reduced set of data records. The data records to be removed may be selected as those that once removed, fulfill a given condition. For example—the certain condition may be the N/2 points that are closest to C, where N is the number of records in P.

Thus, the scoring iteration process can be configured to identify a group of data records Qm with the corresponding centroid Cm, wherein the index M defining the serial number of the data group and the corresponding centroid thereof, is technically not limited.

In such an exemplary case, the centroid may be defined by a computerized process utilizing methods and processes to define the centroids Cm of Qm. In some other cases, the IOT device and/or an intermediate device may utilize a computerized method to calculate Cm of Qm.

At step 220 the JOT device and/or an intermediate device defines for a portion of data records in Q a "normality score" defined as 1/N, wherein N is the number of data records in P at the current iteration. In some cases, such a data record portion defined with "normality score" may be all the data records in Q.

Thus, the data records in Q are associated with the "normality score" corresponded to the number of records in P in the current iteration.

At step 225 the computerized system may be instructed to remove the data records in Q from P. At step 230 the JOT device and/or an intermediate device may verify if there are any data records left in P. In such a case, wherein data records in P can be found, the IOT device and/or an intermediate device may be instructed to re-initiate the scoring iteration according to the instructions at step 215.

Thus, the IOT device and/or an intermediate device may identify a certain number of data records Q with a newly identified centroid C and continue with the process as aforementioned. The IOT device and/or an intermediate device may perform the iterations according to instructions as defined from step 215 to step 225. The IOT device and/or an intermediate device may also be instructed to continue to step 235, in case P is empty after verifying P at step 225.

At step 235 the data set P may be an empty set. In such cases, the data records which are removed from P may be associated with "normality scores". For example, in case P comprises a hundred thousand (100,000) data records, at step 215 as aforementioned. The "normality score" of the data records in Q may be one divided to one hundred thousand (1/100,000). In such exemplary case, if the number of data records in P, after one iteration of the scoring data records, is ten thousand (50,000), the "normality score" of the data records in the newly calculated Q, at step 220, may be set to one divided to ten thousand (1/10,000). By accomplishing step 230 the IOT device and/or an intermediate device may end the scoring iteration. In some cases, the JOT device and/or an intermediate device may store the data records associated with the "normality scores" thereof, in a computer-readable medium.

Figure 2B:
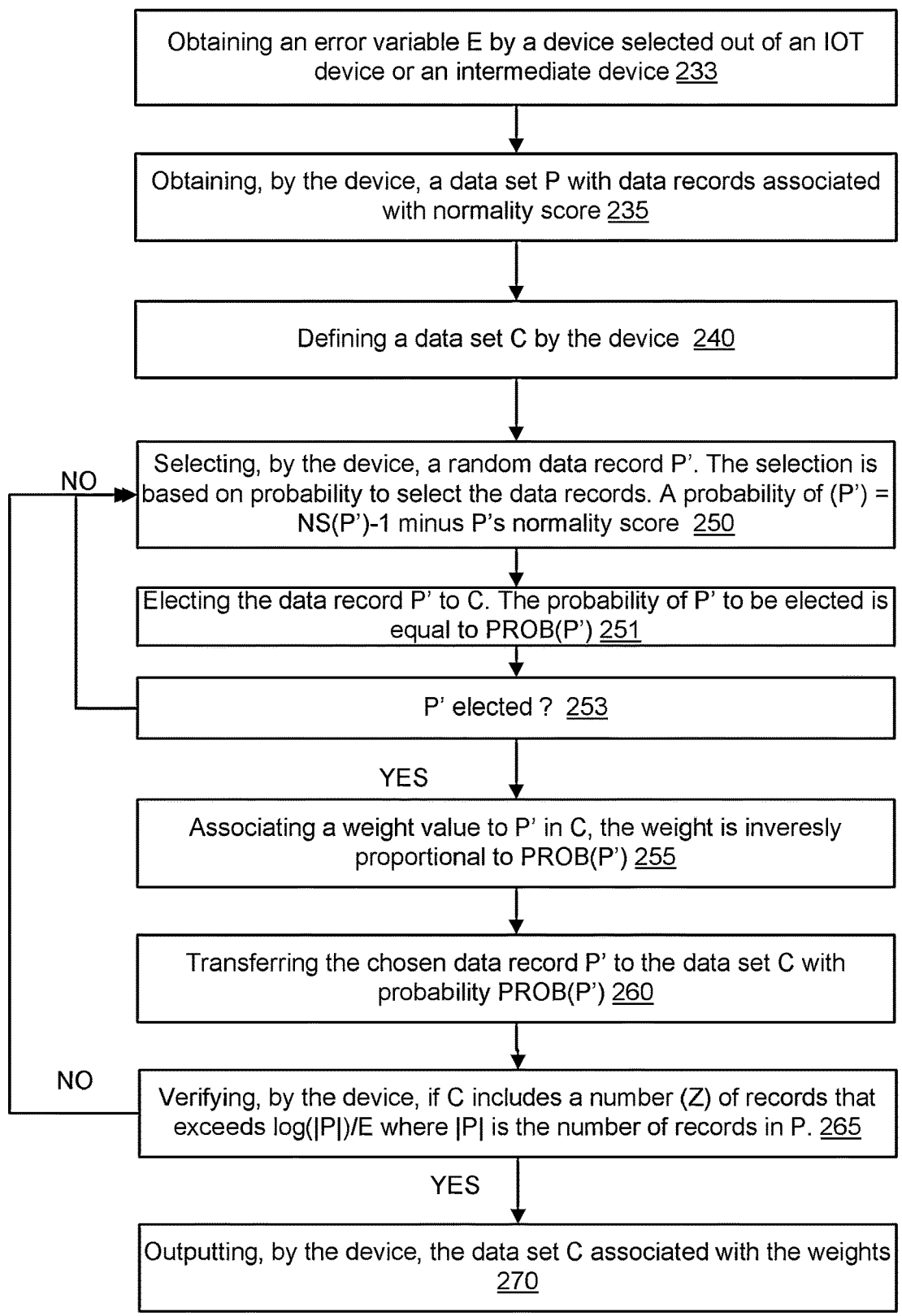
FIG. 2B discloses a method operable by a computerized system.

FIG. 2B discloses a method 202 operable by an IOT device and/or an intermediate device for utilizing a given approximation to identify weighted set of data records (core-set) representing a data set captured from IoT devices, according to exemplary embodiments of the present invention. At step 233 the IOT device and/or an intermediate device may receive a numeric value c. Such a value c (may range between 0 and 1) may be utilized in cluster analysis for constructing a weighted set of data records (core-set) from data set P, as explained below. In some cases, c may be provided by a user utilizing and operating the computerized system. In some other cases, c may be provided in an automatic fashion, by a predefined value residing in the computerized system.

At step 235 the IOT device and/or the intermediate device may obtain a data set P comprising data records associated with "normality scores". In some cases, P may be obtained via a dedicated interface such as a user graphic interface. In some other cases, P can reside in a computer-readable medium configured with the access interfaces required by the computerized device for reading the data structure of P and the "normality scores" associated with the data records in P. At step 240 the IOT device and/or an intermediate device generates a data set denoted as data set C. In some cases, data set C may be an empty data set structure to accommodate data records from the data set P. At step 250 the IOT device and/or an intermediate device selects a random data record, denoted as p' from the data set P according to some distribution.

At step 251 the IOT device and/or an intermediate device elects the data record p' to C, wherein the probability of p' to be elected is equal to prob(p'), and wherein prob(b) is the Normality Score associated to p'. If p' is not elected to C the system may repeat steps 250 and 251 hereof. At step 253 if p' is not elected to C, the IOT device and/or an intermediate device returns to 250.

At step 255 if p' is elected the IOT device and/or an intermediate device may associate a weight value to the chosen data record p' in C, wherein the weight value is inversely proportional to prob(p'). Such a weight value of the data record p', denoted as W(p'), wherein the probability to be chosen to the core-set is prob(p'), can be calculated as W(p')=1/prob(p'). At step 260 the IOT device and/or an intermediate device transfers the chosen data record p' from P to data set C. It should be noted that a sum of weighted squared distances may be included in the core-set At step 265 the IOT device and/or an intermediate device calculates the numeric value 1/ε and verify if the data set C comprises a number of data records which is not larger than log(|P|)/ε where |P| denotes the number of records in P. In case the number of data records in the data set C is below log(|P|)/ε, the IOT device and/or an intermediate device may repeat the processes described from step 250 to step 255. Thus, the IOT device and/or an intermediate device may be instructed to identify 1/ε data records in the data set C associated with weight W(p'). In such a case, the selected 1/ε data records in data set C is the core-set. At step 270 the IOT device and/or an intermediate device may output the core-set. In such case, the output may be in any digital computer-readable format, known for a person having skills in the art.

Figure 3:
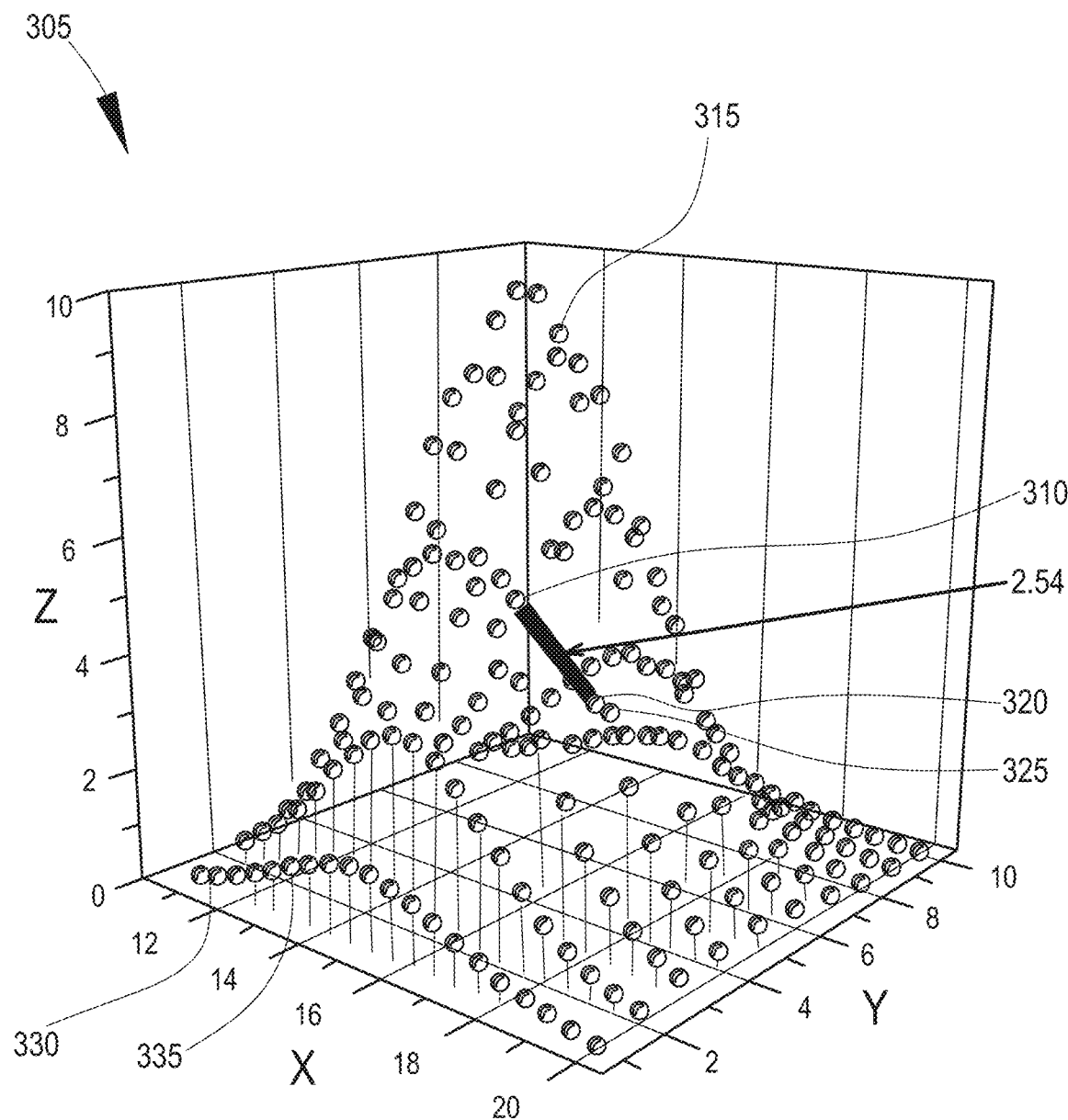
FIG. 3 depicts a clustering in two dimensional of income data with one cluster, according to exemplary embodiments of the present invention.

FIG. 3 depicts a clustering in three (3) dimensions of incoming data with one cluster, according to exemplary embodiments of the present invention. FIG. 3 shows a cluster-graph 305 comprising one cluster 315 with a centroid 310 which can be formed by capturing and arranging information, as aforementioned. The centroid 310 represents the center of mass of a cluster 315 wherein the maximum squared Euclidean distance from the centroid 310, represented by the threshold distance 320 is equal to 2.54. In such cases, the Euclidean distance and the threshold distance 320 may be numeric values representing the distance from the centroid.

The cluster-graph 305 also comprises a data record 325 located at a threshold distance 320 from the centroid 310. In such cases, the data records with distances which are larger than the maximum squared Euclidean distance, represented by the threshold distance 320 may fall outside of the clusters 315. For example, the data records 330, and 335 may fall outside the cluster 315.

The threshold distance 320 can be utilized to present a case, wherein a computerized system configured to choose a set of data records P in the cluster 315, may choose data records characterized with a distance to the centroid 310 which is not greater than the threshold distance 320. In such a case, data records 330, and 335 may remain out of the set of data records P.

Figure 4:
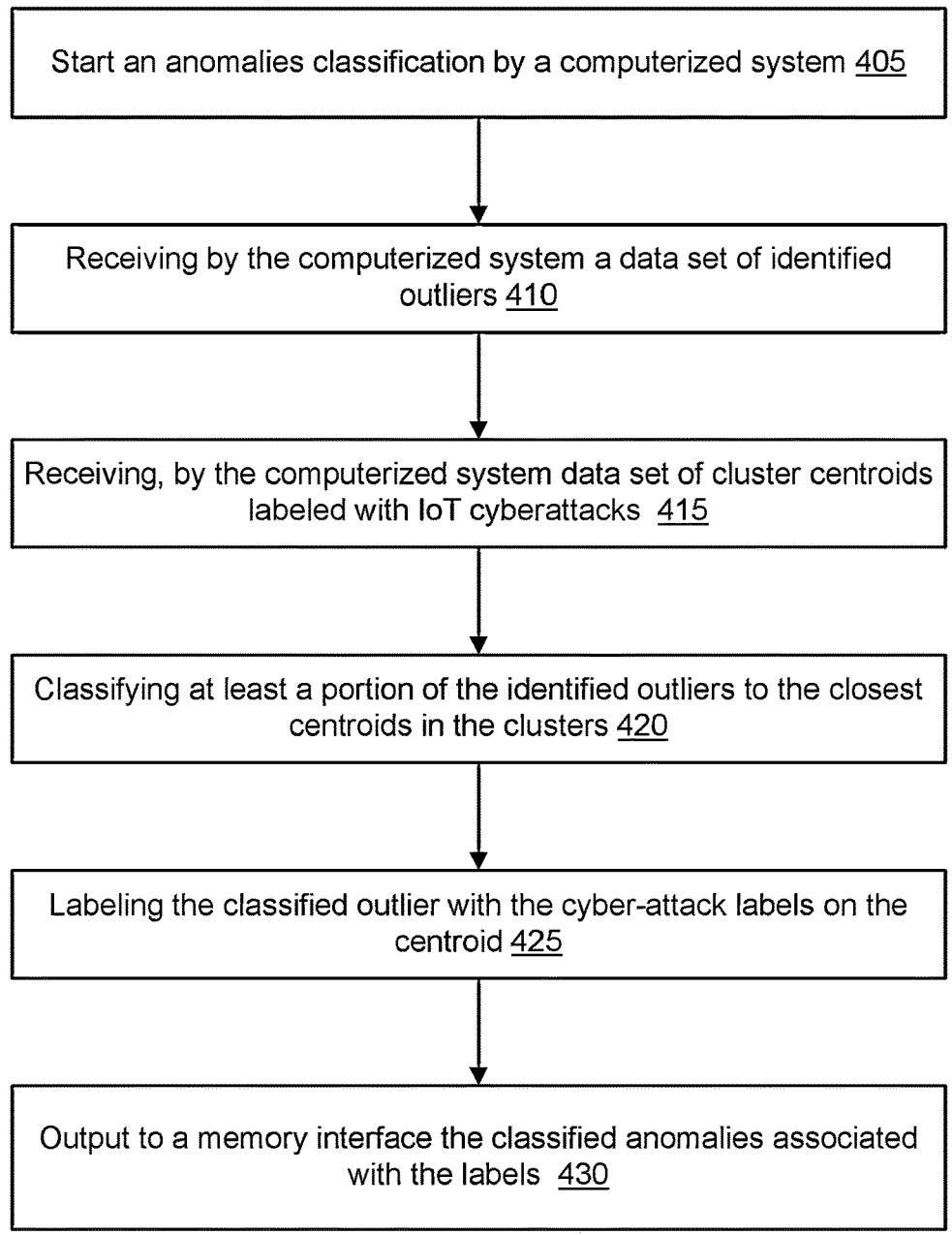
FIG. 4 discloses a computerized process operable by a computerized system for classifying anomalies and label thereof with cyberattacks, according to exemplary embodiments of the present invention.

FIG. 4 discloses a computerized process 400 operable by a computerized system for classifying anomalies and label them with cyberattack categories, according to exemplary embodiments of the present invention.

At step 405 a computerized system may initiate the process denoted as anomalies classification. In some cases, the initiation of the anomalies classification may comprise an initiation of the computerized system on a computerized device.

At step 410 the computerized system receives a data set of identified outliers. In some cases, the outliers may be provided by a data set comprising data records defined as outliers by an outlier detection process. In some cases, such a process may be a computerized process which identifies outlier to be classified on a core-set, as explained below. At step 415 the computerized system may receive data set of cluster centroids labeled with IoT cyberattacks. In such cases the computerized system may receive data set comprising data records which are associated with specific cyberattacks.

At step 420 a classification process may occur to a portion of the identified outliers. The classification process may comprise comparison of the data records identified as outliers with the cluster centroids labeled with cyberattacks and thereby identify whether the identified outliers indicate cyberattacks. For example, a certain identified outlier may have a distance which can be essentially equal or approximated to a distance in the cluster centroids, wherein such a distance from the cluster centroids can be labeled with a specific cyberattack, e.g., "A denial of service attack". In such an exemplary case, the certain identified outlier which was compared with the distance from the cluster centroids may be labeled with a specific cyberattack.

In some cases, the distance from a cluster centroid may be associated with a threshold value determining the proximity level required for being classified as a specific IoT cyberattacks. In some cases, such a classification process may be a computerized process conducted by a computerized system. In some cases, the computerized device may be configured with data bases and instructions for conducting such a classification process.

In some other cases, such a classification process may be involved by a person or persons operating a computer-based system for identifying classes of anomalies according to predefined cyberattack types. For example, the identified groups of anomalies can be such as DDOS Attack, Device takeover, Device replication, Communication hijacking, Replay attack, Operational anomalies, and the like.

At step 425 a labeling process occurs for labeling the outlier according to the cyberattack types thereof. For example, a group of outliers may be labeled as Device takeover attack. In such cases, the labeling of the outlier may be associated with the captured data. Such data can be the device ID, the communication protocol, and the like. At step 430 the computerized system may output to a memory interface, the labeled anomalies associated with the captured data, according to the cyberattack types thereof.

Figure 5:
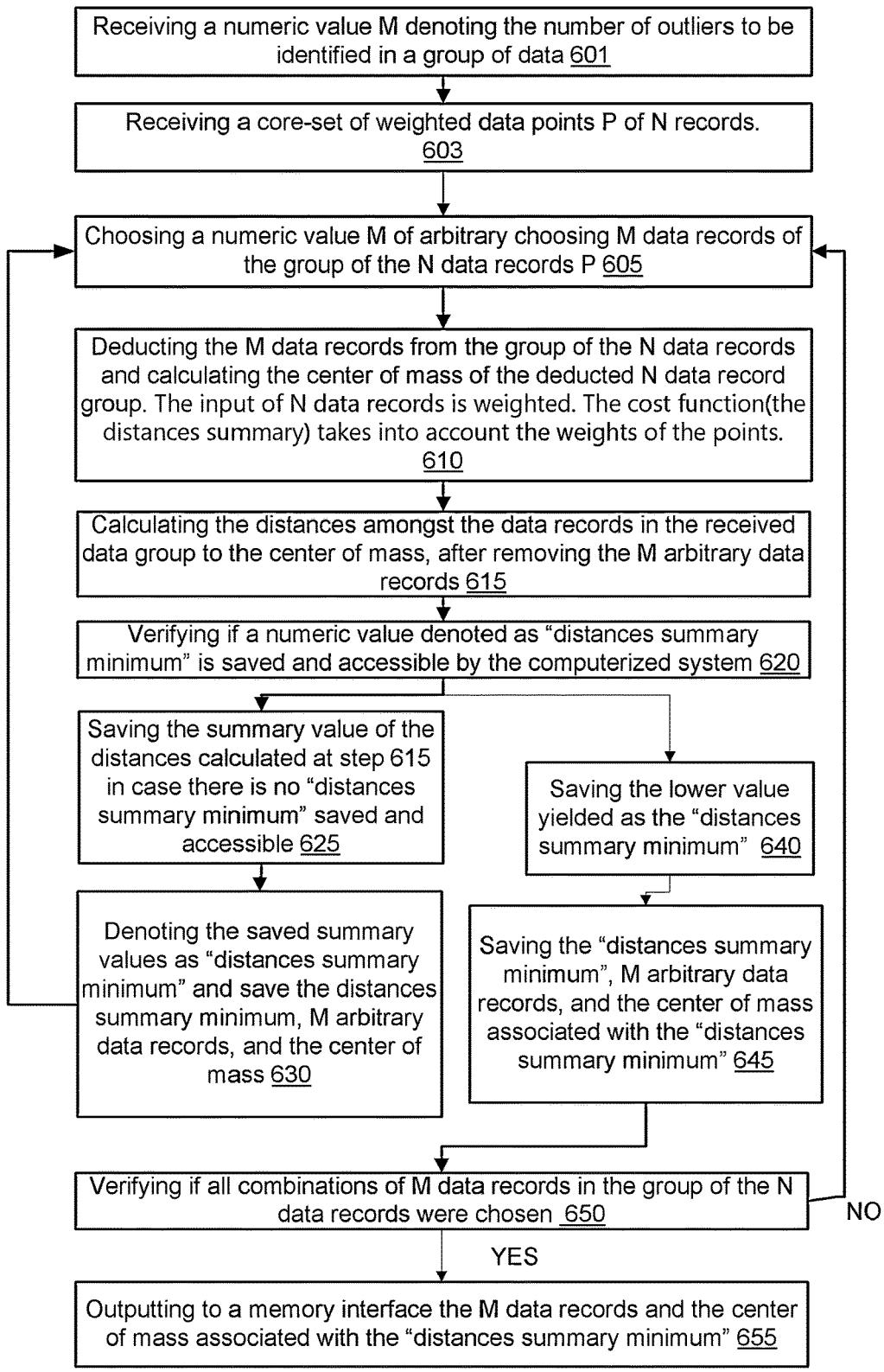
FIG. 5 discloses an outlier detection process for detecting outliers in a core-set, according to exemplary embodiments of the present invention.

FIG. 5 discloses optional outlier detection process 600 for detecting outliers in a core-set, according to exemplary embodiments of the present invention.

At step 601 a computerized system configured and programmed to carry out an outlier detection process may receive a group of N data records with associated weights by the computerized system, wherein N is a numeric value; the group of N data records may be a core-set produced, as aforementioned.

At step 605 the computerized system may receive a numeric value M and arbitrarily choose M data records of the group of the N data records.

At step 610 the computerized system deducts the M data records from the group of the N data records and calculates the Center of Mass of the deducted N data record group, wherein the center of mass is calculated by considering the weights associated with the data records of the group.

At step 615 the computerized system calculates the distances amongst the data records in the received group to the center of mass, after removing M data records from the received group. For example, in case the N is equal to 1,000 such that the group of the data records comprises 1,000 weighted data records, and the number M for arbitrary data records is 70, the computerized system may reduce 70 arbitrary data records from the 10,00 data record and calculate the distances of the remaining 930 data records to the center of mass. In such cases, the weights associated with the 930 data records may also be utilized in the distance calculation.

At step 620 the computerized system may verify if a numeric value denoted as "distances summary minimum" is saved and accessible by the computerized system. At step 625, the computerized system may save the summary value of the distances calculated at step 615 in case there is no "distances summary minimum" saved and accessible, by the computerized system. At step 630 the computerized system may denote the saved summary value as "distances summary minimum" and save the distances summary minimum, M arbitrary data records, the center of mass and continuing to step 605.

Step 635 discloses a case wherein there is a "distances summary minimum" value, saved by the computerized system. In such a case, the computerized system may compare the summary value of the distances calculated at step 615 with the "distances summary minimum", at step 640 the computerized system may save the lower value yielded at the comparison in step 635 as the "distances summary minimum". At step 645 the computerized system may save the M arbitrary data records and the center of mass associated with the "distances summary minimum". At step 650 the computerized system may verify if all combinations of M data records in the group of the N data records were chosen by the computerized system. In some cases, if not all combinations of M data records in the group of the N data records were chosen, the computerized system may go to step 605 for choosing another M data record of the group of the N data records, as aforementioned. In some other cases, if all combinations of M data records in the group of the N data records were chosen the computerized system continues to step 655. At step 655 the computerized system may output to a memory interface the M data records and the center of mass associated with the "distances summary minimum "In such case the M data records may be identified as outliers. In some cases, the M data records identified as outliers may be structured for undergo a process of classifying anomalies and label them with cyberattack categories, as aforementioned.

Figure 6:
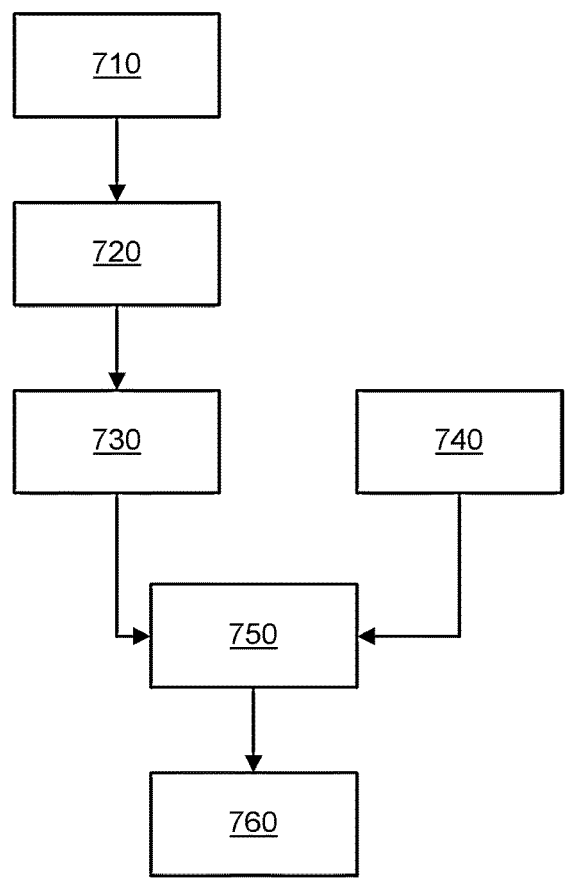
FIG. 6 illustrates an example of a method.

FIG. 6 illustrates method 700 for detecting a cyberattack or an operational issue.

Method 700 may include step 710 of generating, by an internet of thing (IOT) device or by an intermediate device located upstream to the IOT devices and downstream to a computerized system, a first core-set.

The first core-set may include weighted records that are an approximation of a first data set related to a behavior of the IOT device.

Step 710 may be followed by step 720 of sending to a computerized system the first core-set.

Step 720 may be followed by step 730 of finding, by the computerized system, outliers in the FIRST core-set.

Method 700 may also include step 740 of receiving or generating, by the computerized system, a second data set that may include one or more cluster centroids related to the behavior of the IOT device and associated with at least one out of (i) one or more IOT cyberattacks and (ii) operational issues.

Steps 730 and 740 may be followed by step 750 of determining, by the computerized system, relationships between the outliers of the first core-set and the one or more cluster centroids.

Step 750 may be followed by step 760 of determining, by the computerized system, whether the first core-set may be indicative of the at least one out of (i) one or more IOT cyberattacks and (ii) operational issues, based on the relationships.

Step 750 may include calculating distances between the outliers that belong to the first core-set and the one or more cluster centroids.

Step 760 may include determining that a certain outlier may be associated with a certain operational issue or with a certain cyberattack when the distance between the certain outlier and a cluster centroid associated with the certain cyberattack or the certain operational issue may be smaller than a certain threshold.

Step 710 may be executed by the IOT device and/or by an intermediate device.

The first data set may have a certain size (N) and a size of the core-set may be an order of log(N).

The second data set may include one or more cluster centroids related to the behavior of multiple IOT devices and associated with the one or more IOT cyberattacks.

Step 710 and/or step may be based on a predefined error limit.

Method 700 may include searching for at least one outlier of the outliers that belong to the first core-set set.

Step 710 may include conducting a preprocessing procedure that may include removing information of a format that differs from a predefined data format and cleaning noise.

Step 710 may include calculating normality scores for a first plurality of records of the first data set captured from the multiple Internet of things devices.

Method 700 may include assigning probabilities to the first plurality of records, wherein the assigning may be respective to the normality scores of the first plurality of records.

Method 700 may include selecting a second plurality of records based on the probabilities of the first plurality of records to provide a second plurality of selected records, and assigning weights to the second plurality of selected records to provide a second plurality weighted records.

The behavior of the IOT device may include operational activities of the IOT device.

The behavior of the IOT device may include one or more communication techniques used by the IOT device.

The behavior of the IOT device may include at least one out of a start communicating time, a stop communicating time.

The behavior of the IOT device may include at least one out of a session key used for communication, a port utilized for communication, an identifier of a target device communicated with the IOT device, a number of TCP/IP packet sent, a number of TCP/IP packets received.

The behavior of the IOT device may include at least one out of an upload content, a length, a number of bytes received, and a number of bytes sent.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

We claim:

1. A method for real time detection of anomalies in a behavior of a plurality of Internet of Things (IOT) devices communicating over a communication network, the anomalies indicative of at least one cyberattack or an operational issue on a scale short execution time, the method comprising:

generating, by an (IOT) IOT device or by an intermediate device located upstream of the IOT device and downstream of a computerized system, a first core-set, the first core-set comprising a subset of weighted records of data set and outliers in the data set, wherein the first core-set is an approximation of the data set and the first core set is of a size of an order of log (N) data records, and wherein the core set has a predefined error limit (epsilon);

sending to a computerized system the first core-set;

finding, by the computerized system, outliers in the first core-set;

receiving or generating, by the computerized system, a second data set that comprises one or more cluster centroids related to the behavior of the IOT device and associated with at least one of (i) one or more IOT cyberattacks and (ii) operational issues;

determining, by the computerized system, distances between the outliers that belong to the first core-set and the one or more cluster centroids; and determining, by the computerized system, whether the first core-set is indicative of the at least one of (i) one or more IOT cyberattacks and (ii) operational issues, based on the relationships, wherein the step of generating the first core-set from the entire data set comprises:

calculating a normality score to each data record in the data set in an iterative procedure;

assigning probabilities to each data record in the data based on the normality score; and selecting an order of log(N) data records from the data set to the first core-set based on the probabilities of each data record, wherein the first core-set comprises the outliers.

2. The method according to claim 1 further comprising determining that a certain outlier is associated with a certain operational issue or with a certain cyberattack when the distance between the certain outlier and a cluster centroid associated with the certain cyberattack or the certain operational issue is smaller than a certain threshold.

3. The method according to claim 1, wherein the generating comprises searching for at least one outlier of the outliers that belong to the first core-set set.

4. The method according to claim 1, wherein the generating comprises conducting a preprocessing procedure that comprises removing information of a format that differs from a predefined data format and cleaning noise.

5. The method according to claim 1, further comprising selecting a second plurality of records based on the probabilities of the first plurality of records to provide a second plurality of selected records, and assigning weights to the second plurality of selected records to provide a second plurality of weighted records.

6. The method according to claim 1, wherein the behavior of the IOT device comprises operational activities of the IOT device.

7. The method according to claim 1, wherein the behavior of the IOT device comprises one or more communication techniques used by the IOT device.

8. The method according to claim 1, wherein the behavior of the IOT device comprises at least one of a start communicating time and a stop communicating time.

9. The method according to claim 1, wherein the behavior of the IOT device comprises at least one of a session key used for communication, a port utilized for communication, an identifier of a target device communicated with the IOT device, a number of TCP/IP packets sent, and a number of TCP/IP packets received.

10. The method according to claim 1, wherein the behavior of the IOT device comprises at least one of an upload content, a length, a number of bytes received, and a number of bytes sent.

11. A non-transitory computer readable medium having a set of computer-executable instructions stored thereon, wherein execution of the computer-executable instructions by a computer results in the computer implementing the following steps:

receiving, by a computerized system, a first data set captured from a plurality of internet of things (IOT) devices, wherein an entire first data set is defined by including all members of the first data set;

performing by an IOT device or by an intermediate device located upstream of the IOT device and downstream of a computerized system an iterative procedure for generating from the entire first data set, a first core-set including a subset of weighted records of the first data set and outliers in the first data set, wherein the first core-set is an approximation of the first data set and the core set has a size that is smaller than a size of the first data set is of a size of an order of log (N) data records, and wherein the first core set has a predefined error limit (epsilon);

sending to a computerized system the first core-set;

finding, by the computerized system, outliers in the first core-set;

performing an outlier detection procedure to detect outliers in the first core-set anomalies in a behavior of a plurality of IOT devices communicating over a communication network, wherein the anomalies are indicative of at least one cyberattack on a scale short execution time;

receiving or generating, by the computerized system, a second data set that comprises one or more cluster centroids associated with at least one of (i) one or more IOT cyberattacks and (ii) operational issues;

determining distances between outliers that belong to the first data set and the one or more cluster centroids; and determining whether the first data set is indicative of one or more cyberattacks based on the distances;

wherein the step of generating the core set from the entire first data set includes:

calculating a normality score to each data record in the first data set in an iterative procedure, assigning probabilities to each data record in the first data based on the normality score, and selecting an order of log(N) data records from the first data set to the first core-set based on the probabilities of each data record, wherein the first core-set comprises the outliers.

12. A computerized system that comprises a processing circuit and memory that are configured to cooperate to:

receive a first data set captured from a plurality of internet of things (IOT) devices, wherein the first data set is raw data in a certain size (N), wherein an entire first data set is defined by including all members of the first data set;

perform an iterative procedure to generate from the entire first data set, a first core-set including a subset of weighted records of the first data set and outliers in the first data set, wherein the first core-set is an approximation of the first data set and the core set has a size that is smaller than a size of the first data set is of a size of an order of log(N) data records, and wherein the core set has a predefined error limit (epsilon);
send to a computerized system the first core-set;
find, by the computerized system, outliers in the first core-set;
perform an outlier detection procedure to detect outliers in the first core-set anomalies in a behavior of a plurality of IOT devices communicating over a communication network, wherein the anomalies are indicative of at least one cyberattack on a scale short execution time;
receive or generate a second data set that comprises one or more cluster centroids associated with one or more IOT cyberattacks or operational events;
determine distances between outliers that belong to the first data set and the one or more cluster centroids; and
determine whether the first data set is indicative of one or more cyberattacks or operational events based on the distances,
wherein the step of generating the core set from the entire first data set includes:
calculating a normality score to each data record in the first data set in an iterative procedure,
assigning probabilities to each data record in the first data based on the normality score, and
selecting an order of log(N) data records from the first data set to the core-set based on the probabilities of each data record, wherein the first core-set comprises the outliers.

* * * * *